United States Patent [19]

Broeske

[11] Patent Number: 5,067,737
[45] Date of Patent: Nov. 26, 1991

[54] WHEELBARROW HAVING A PAIR OF AUXILIARY DUMPING RODS

[76] Inventor: Bryon C. Broeske, R.R. No. 1, Box 159, Dorchester, Wis. 54425

[21] Appl. No.: 635,700

[22] Filed: Dec. 28, 1990

[51] Int. Cl.[5] .................................................. B62B 1/22
[52] U.S. Cl. .............................. 280/47.31; 280/47.32; 280/47.33; 298/3
[58] Field of Search ............... 280/659, 47.31, 47.32, 280/47.33, 47.16, 47.2, 47.315, 47.3, 79.2; 298/3, 17 SG, 17 B, 2, 5; D12/15

[56] References Cited

U.S. PATENT DOCUMENTS

| | | | |
|---|---|---|---|
| 1,031,454 | 7/1912 | Lawrence | 280/47.31 |
| 1,436,965 | 11/1922 | Landkamer | 280/47.31 X |
| 1,459,898 | 6/1923 | Mulvihill | 280/47.31 |
| 1,476,635 | 12/1923 | Newton | 294/68.26 |
| 1,581,231 | 4/1926 | Senger | 37/140 |
| 2,102,684 | 12/1937 | Dorward | 280/47.12 |
| 2,189,079 | 2/1940 | Mueller et al. | 298/2 |
| 2,579,077 | 12/1951 | Hubner | 280/47.33 X |
| 2,588,503 | 3/1952 | Dwyer | 280/47.31 X |
| 2,664,310 | 12/1953 | Mueller et al. | 298/5 |
| 2,992,834 | 7/1961 | Tidwell | 280/47.3 |
| 3,248,128 | 4/1966 | Grable | 280/47.31 |
| 3,888,501 | 6/1975 | McChesney | 280/47.18 |
| 4,889,360 | 12/1989 | Havlovitz | 280/47.315 X |
| 4,921,305 | 5/1990 | Steer | 280/47.31 X |

FOREIGN PATENT DOCUMENTS

| | | | |
|---|---|---|---|
| 233969 | 10/1963 | Austria | 280/47.31 |
| 1286409 | 1/1969 | Fed. Rep. of Germany | 280/47.16 |
| 538906 | 6/1922 | France | 280/47.31 |
| 781758 | 5/1935 | France | 298/175 G |
| 921957 | 5/1947 | France | 280/47.31 |
| 1281947 | 12/1961 | France | 280/47.31 |
| 122300 | 6/1948 | Sweden | 280/47.31 |
| 148618 | 1/1955 | Sweden | 280/47.2 |
| 410647 | 10/1966 | Sweden | 280/47.31 |
| 1332010 | 10/1973 | United Kingdom | 280/47.31 |
| 2073677 | 10/1981 | United Kingdom | 280/47.31 |

*Primary Examiner*—Andres Kashnikow
*Assistant Examiner*—Brian L. Johnson
*Attorney, Agent, or Firm*—Berman & Aisenberg

[57] ABSTRACT

A wheelbarrow includes a load box, a supporting wheel and a pair of handles for guiding the wheelbarrow. The wheelbarrow further includes a pair of curved dumping rods extending upward above said load box. The dumping rods each include a small wheel for rotating in a counter-clockwise direction which facilitates turning the wheelbarrow for emptying. A framework is attached to an underside of the load box for securing an axle for the supporting wheel. A support is attached to the framework forwardly of the supporting wheel for engaging the ground when the wheelbarrow is rotated for emptying. A stand, attached to the framework behind the wheel, supports the wheelbarrow when stationary.

17 Claims, 2 Drawing Sheets

WHEELBARROW HAVING A PAIR OF AUXILIARY DUMPING RODS

FIELD OF THE INVENTION

The invention relates to a wheelbarrow for farm or garden use.

BACKGROUND OF THE INVENTION

Known wheelbarrows suffer from disadvantages of difficulty in use, particularly when emptying the wheelbarrow of its contents. Wheelbarrows are, generally, difficult to empty completely. Dorward, U.S. Pat. No. 2,102,684, discloses a rocker dump hand cart in which dumping rods extend forwardly of the cart. Rocker members are also shown in Mueller et al., U.S. Pat. Nos. 2,664,310 and 2,189,079. Dwyer, U.S. Pat. No. 2,588,503, describes an elevated wheelbarrow having a small central wheel for assisting in dumping the contents of the wheelbarrow. Newton, U.S. Pat. No. 1,476,635 and Senger, U S. Pat. No. 1,581,231, each show an elevated attachment for a wheelbarrow. The patent to Lawrence, U.S. Pat. No. 1,031,454, shows a wheelbarrow having a recessed wheel. None of these patents show the advantageous system of the invention described herein.

SUMMARY OF THE INVENTION

A wheelbarrow includes a load box, a supporting wheel and a pair of handles for guiding the wheelbarrow. The wheelbarrow further includes a pair of curved dumping rods extending upward above said load box. The dumping rods each include a small wheel for rotating in a counter-clockwise direction which facilitates turning the wheelbarrow for emptying. A framework is attached to an underside of the load box for securing an axle for the supporting wheel. A support is attached to the framework forwardly of the supporting wheel for engaging the ground when the wheelbarrow is rotated for emptying. A stand, attached to the framework behind the wheel, supports the wheelbarrow when stationary.

DETAILED DESCRIPTION OF THE INVENTION

A wheelbarrow of the invention is easier to use, and can be used more efficiently, than a known wheelbarrow. The wheelbarrow includes curved dumping rods, for facilitating emptying the wheelbarrow, extending above the wheelbarrow. The dumping rods are preferably attached to an upper perimeter of the load box of the wheelbarrow. The wheelbarrow also has a low center of gravity, for stability.

The wheelbarrow has a load box which is preferably made of plastic, but which may be made of metal, or other material known to one skilled in the art. A preferred plastic load box is molded seamlessly in one piece and is manufactured of heavy gauge plastic material suitable for outdoor use in cold temperatures. The wheelbarrow has a single, centrally located supporting wheel which is preferably recessed into the bottom of the load box, protected by a fender. This provides a low center of gravity for the wheelbarrow which helps to prevent tipping. The wheel axle is preferably attached to a framework on the underside of the load box.

The upper edge of the load box curves over an elongated member which extends around the upper perimeter of the load box and terminates in two parallel handles. The elongated member may be a tubular pipe or conduit. The dumping rods, which are preferably of metal, for strength, but which may be of solid, rigid plastic, are curved elongated members which extend above the load box. The dumping rods may be attached to the upper perimeter of the load box and may extend in a curve upward between two spaced apart positions on the upper edge of the load box. The wheelbarrow turns on the dumping rods as it is emptied. The dumping rods preferably include a small wheel which rotates counter-clockwise as the load box is being emptied, thus facilitating rotation of the wheelbarrow for emptying.

To further facilitate emptying the wheelbarrow, a stand is provided in front of the supporting wheel of the wheelbarrow. When the wheelbarrow is emptied, the stand touches the ground before the load box. This makes turning the wheelbarrow for emptying much easier as the wheel itself does not touch the ground as the wheelbarrow is rotated forwards during emptying. On emptying the wheelbarrow, the stand touches the ground first, then the wheelbarrow is rotated forwardly o the curved front surface of the load box and then onto the dumping rods and onto the small wheels on the dumping rods. When the entire contents of the wheelbarrow have been emptied, the wheelbarrow is pulled back, using the forward stand and rear stand for assistance in righting the wheelbarrow.

Figure 1:
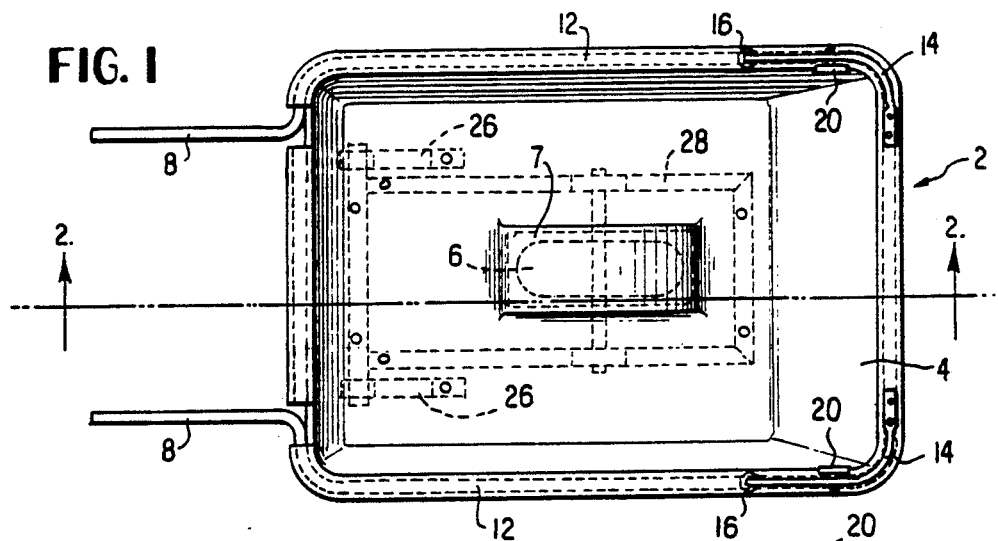
FIG. 1 is a top plan view of a wheelbarrow of the invention.
Figure 2:
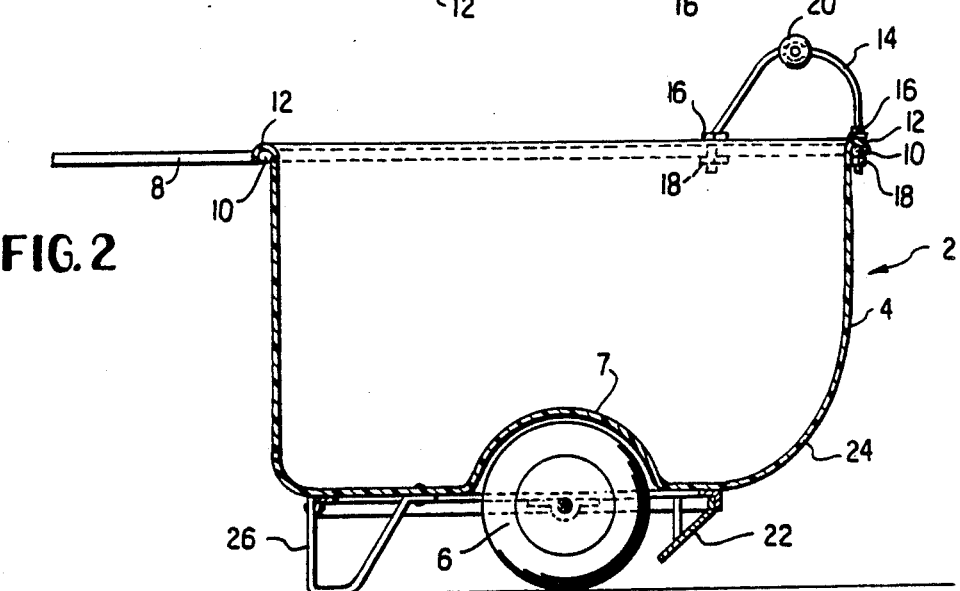
FIG. 2 is a cross sectional view taken on line 2—2 of FIG. 1.
Figure 3:
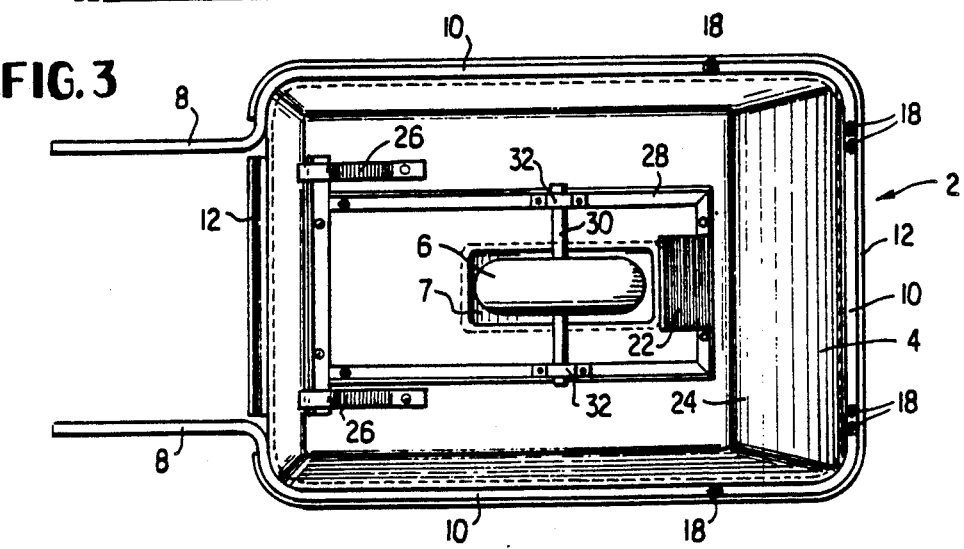
FIG. 3 is a bottom plan view of the wheelbarrow of FIG. 1.

With reference to the drawings in which like numerals represent like parts, FIGS. 1 to 5 illustrate wheelbarrow 2 which includes load box 4, supporting wheel 6 and handles 8. FIGS. 1 to 3 illustrate that handles 8 are part of elongated member 10 which is held under curved rim 12 of load box 4. Alternatively, handles 8 may be welded to member 10 or attached to the wheelbarrow as known in the art. Supporting wheel 6 is protected by fender 7 molded integrally with load box 4.

Dumping rods 14 are attached to elongated member 10 by bolting to curved rim 12 of load box 4. Dumping rods 14 may be elongated tubular members which are secured by bolts 16 and nuts 18 to rim 12 and elongated member 10. Other appropriate methods of attaching the dumping rods, such as welding or riveting, may be used. Dumping rods 14 may include a small rotatable wheel 20 illustrated in FIGS. 1, 2 and 4, attached at approximately the high point of each dumping rod, for facilitating emptying the wheelbarrow.

Figure 4:
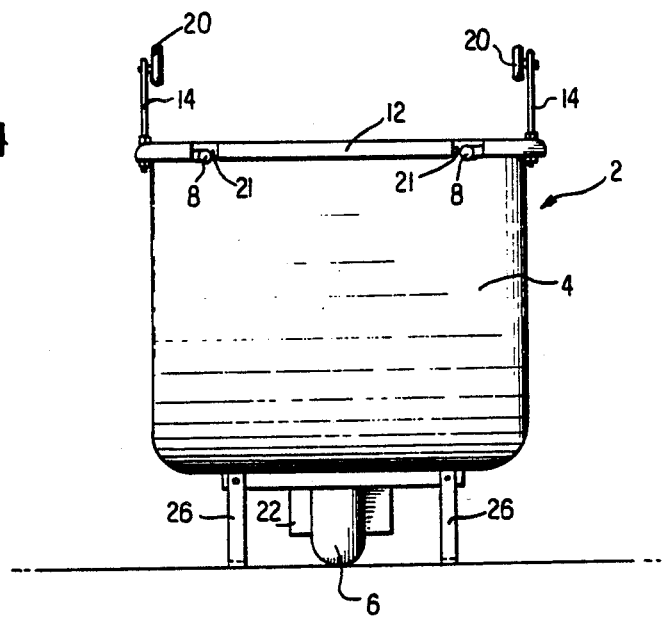
FIG. 4 is a rear elevational view of the wheelbarrow of FIG. 1.

FIG. 4 shows a rear view of wheelbarrow 2, showing handles 8 held under curved rim 12 of load box 4. Curved rim 12 includes openings 21 sized to allow handles 8 to turn toward the operator for pushing the wheelbarrow. Curved rim 12 adds strength to load box 4.

Figure 5:
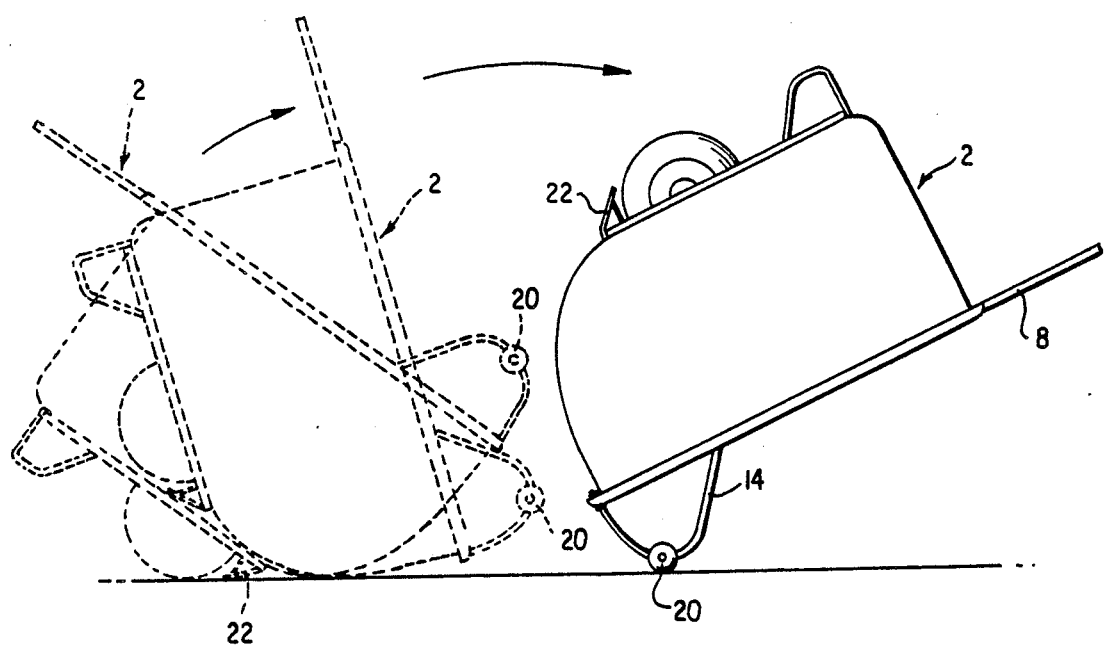
FIG. 5 is a schematic view showing emptying a wheelbarrow of FIG. 1.

As illustrated in FIG. 5, when wheelbarrow 2 is rotated forwards for emptying, the wheelbarrow rotates on wheel 6, which is preferably a pneumatic wheel, then onto front support 22 and further onto curved forward end 24 of load box 4 and dumping rods 14. Small wheels 20 support the wheelbarrow as it is emptied. These wheels rotate in a counter-clockwise direction as the wheelbarrow is tipped over to empty the entire contents. During emptying of the wheelbarrow the user may hold onto front support 22. The wheelbarrow is returned to its upright position by rotating the wheelbarrow back toward the user, by holding onto front support 22, rear support 26 and handles 8, in turn.

FIG. 3 illustrates the underside of wheelbarrow 2 and particularly shows the wheel supporting structure. Frame 28 may be constructed of angle-iron members. Wheel 6 is held on axle 30 secured to frame 28 by brackets 32. Other means of securing the wheel axle to the frame, such as using an axle and cotter pin, may be used. Front support 22 is secured to the forward end of frame 28 and rear supports 26 are secured to the rearward end of frame 28.

While the invention has been described above with respect to certain embodiments thereof, it will be appreciated that variations and modifications may be made without departing from the spirit and scope of the invention.

What is claimed is:

1. A wheelbarrow comprising a load box, a supporting wheel rotatably engaged with said load box at least one handle engaged with a rearward end of said load box for guiding the wheelbarrow, wherein said wheelbarrow further comprises a pair of dumping rods each extending in a curve upward between and engaged with two spaced apart positions on an upper edge of a forward end of said load box wherein said dumping rods are in a ground engaging position on dumping of a load from said load box.

2. A wheelbarrow according to claim 1 wherein the dumping rods each further comprises rotating means engaged with said dumping rods for facilitating turning the wheelbarrow to empty the load box.

3. A wheelbarrow according to claim 2 wherein the rotating means comprises a small wheel attached to each dumping rod.

4. A wheelbarrow according to claim 3 wherein each said small wheel rotates counterclockwise.

5. A wheelbarrow according to claim 1 wherein the supporting wheel is recessed into the load box and covered by a fender, whereby said wheel is supported by a horizontal axle engaged with said load box adjacent an underside of the load box.

6. A wheelbarrow according to claim 1 further comprising means for engaging the ground when the wheelbarrow is rotated for emptying, said ground engaging means being attached to the load box forwardly of the supporting wheel.

7. A wheelbarrow according to claim 6 further comprising a stand for supporting the wheelbarrow attached to the load box rearwardly of the supporting wheel.

8. A wheelbarrow according to claim 1 wherein said load box includes a curved upper edge portion.

9. A wheelbarrow according to claim 8 wherein said curved upper edge portion substantially follows the contour of an elongated tubular member secured under said curved upper edge portion.

10. A wheelbarrow according to claim 8 wherein said load box is molded of plastic material.

11. A wheelbarrow according to claim 1 wherein said load box further comprises a framework attached to an underside thereof.

12. A wheelbarrow according to claim 11 wherein said framework comprises an axle engaged with said framework for supporting said wheel.

13. A wheelbarrow according to claim 12 wherein said load box comprises a fender portion for protecting said wheel recessed into said load box.

14. A wheelbarrow according to claim 1 wherein said load box comprises a curved forward end surface.

15. A wheelbarrow according to claim 14 wherein said load box is molded of plastic material.

16. A wheelbarrow according to claim 14 wherein said wheelbarrow further comprises a framework forwardly of said supporting wheel said framework engaged with said load box for engaging the ground when the wheelbarrow is rotated for emptying.

17. A wheelbarrow comprising a load box including a curved front end surface, a supporting wheel engaged with said load box and a pair of handles engaged with said load box for guiding the wheelbarrow, wherein said wheelbarrow further comprises a pair of curved dumping rods engaged with said load box extending upward above said load box between two spaced apart positions of an upper edge of said load box, said dumping rods each comprising a small wheel attached thereto above the level of said load box for rotating in a counterclockwise direction for facilitating turning the wheelbarrow for emptying, a framework attached to an underside of said load box for supporting an axle, wherein said supporting wheel is mounted on said axle, and means attached to said framework forwardly of said supporting wheel for engaging the ground when the wheelbarrow is rotated for emptying and a stand attached to said framework rearwardly of said supporting wheel for supporting the wheelbarrow when standing, whereby said dumping rods and small wheels support the wheelbarrow as said load box is emptied.

* * * * *